Feb. 8, 1927.
S. W. GREEN
1,616,745
WOODWORKING MACHINE
Filed Aug. 20, 1923    2 Sheets-Sheet 1
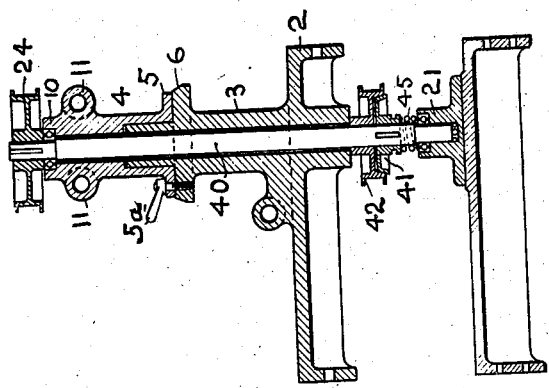
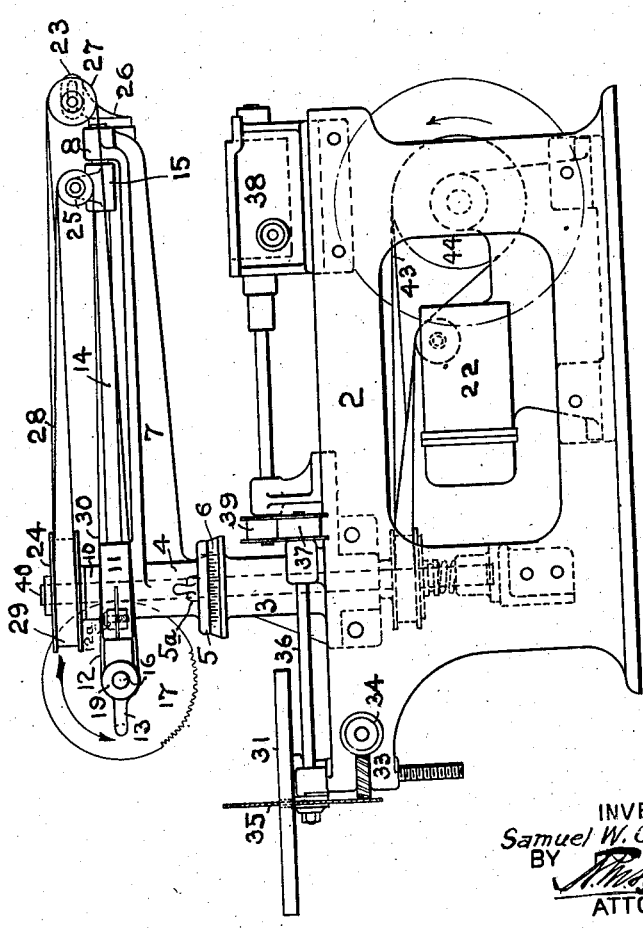
INVENTOR
Samuel W. Green.
BY
ATTORNEY Feb. 8, 1927.
S. W. GREEN
1,616,745
WOODWORKING MACHINE
Filed Aug. 20, 1923
2 Sheets-Sheet 2
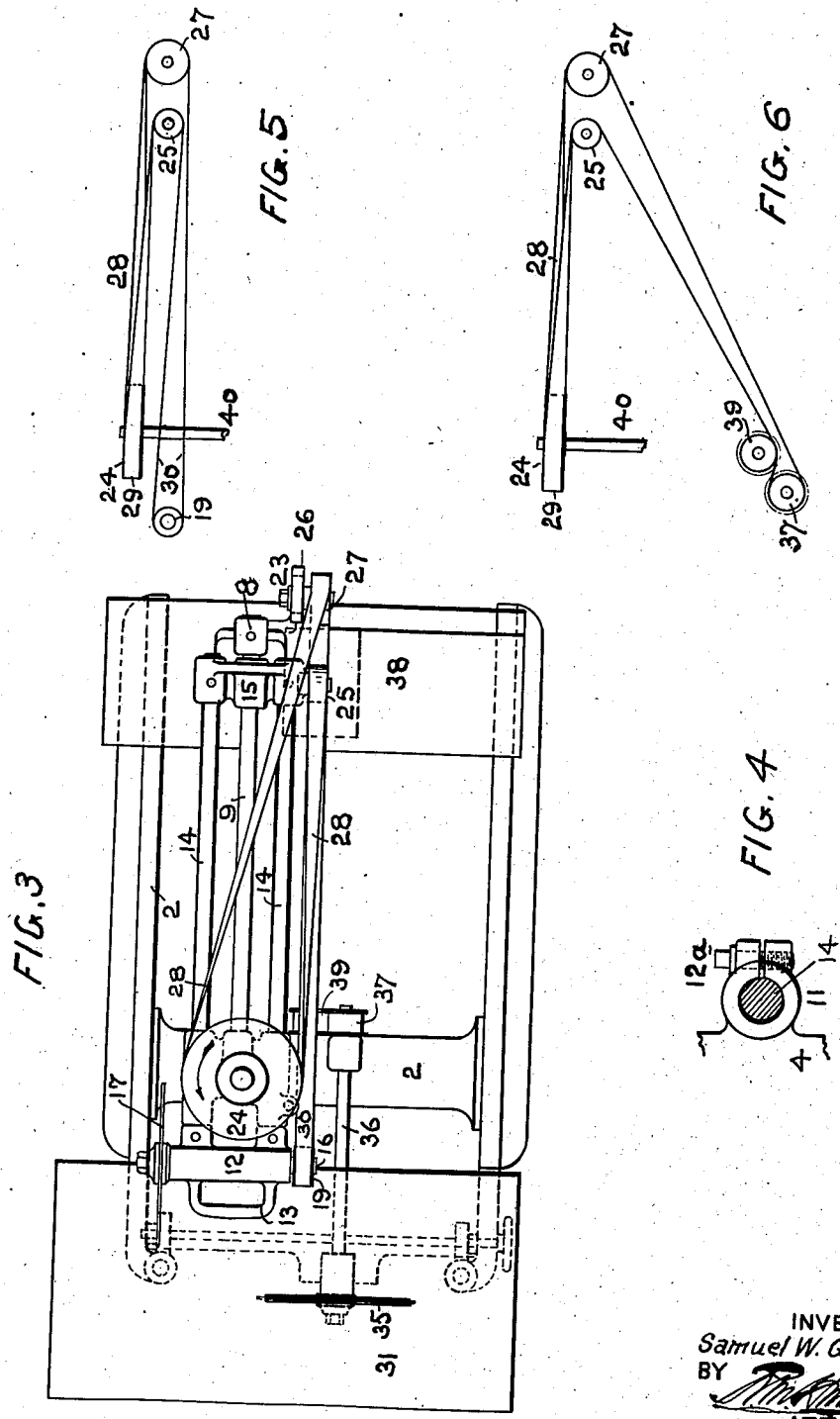
INVENTOR
Samuel W. Green.
BY
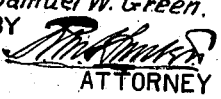
ATTORNEY Patented Feb. 8, 1927.

1,616,745

UNITED STATES PATENT OFFICE.

SAMUEL W. GREEN, OF PHILADELPHIA, PENNSYLVANIA.

WOODWORKING MACHINE.

Application filed August 20, 1923. Serial No. 658,221.

My invention has for an object the construction of a wood-working machine especially adapted for performing operations of sawing, such as cross cutting, mitering and kindred operations, and which, by suitable adjustment, may also be adapted for jointing and rip sawing, the machine being self-contained and having universal capacity for doing wood work which involves sawing and jointer work.

The object is furthermore to so construct the machine that it is portable and easily transferred and usable at the place where the work is to be done.

Heretofore, in machines of similar character, it has been customary to mount the cross cut saw upon an adjustable frame which was movable in the direction of the plane of the saw, said frame being carried upon a vertical adjustable turn-table or support, whereby it could be adjusted in a horizontal plane about a vertical axis, but in all of these cases, the motor which has been belted to the saw mandrel has been supported at a great distance from the vertical axis about which the frame is adjusted, the motor either being secured to the sliding frame carrying the cross cut saw or to a rearwardly extended arm at a great distance from the vertical axis of the frame, the former imposing great weight upon the sliding frame and interfering with the freedom of operation, and the latter producing a vibration which interferes more or less with the accuracy of the saw cut. It has been found that the great weight of the motor, when driving the operating belt at a high speed and when arranged at a distance from the vertical axis of the adjustable frame, causes considerable wear upon the guides of the frame and shortens the effective life of the machine as a whole.

By my improvements, these objections to existing woodworking machines are overcome, as the entire weight of the motor is removed from the carriage and from the rearwardly extending arms beyond the carriage and is positioned upon the base frame of the machine with suitable power transmission devices extending upwardly for rotating a driving belt wheel arranged at the upper part of the adjustable frame and sliding carriage, from which belt wheel power is transmitted through a belt to the cross cut saw mandrel (and to the rip saw and jointer when used), whereby its weight is entirely removed from the sliding carriage and from the adjustable frame itself, with the result that the vibration of the motor as well as its weight is removed from the operating parts, not only in their effect upon the operation of the sliding carriage carrying the cross cut saw, but also in respect to burdening the adjustable frame with an objectionable load which tends to interfere with the proper adjustment about the vertical axis and cause undue wear of the adjustable parts.

Considering my invention more particularly as to the construction of the machine, I provide a suitable frame preferably adjustable about a vertical axis, said frame having a rearwardly extending guide arm carrying at its rear end a guide pulley, a sliding carriage carrying a saw journaled thereon, the mandrel of which is provided with a pulley and said sliding carriage guided upon the adjustable frame adjacent to its vertical axis, and also having rearwardly extending guiding means guided upon the rearwardly extending guide arm of the adjustable frame, said carriage also provided with a pulley at its rear end and said adjustable frame having a vertical shaft coincident with its vertical axis and provided at the top with a driving belt pulley, said pulley belted to the pulley on the saw mandrel by an endless belt, one portion of which passes about the pulley on the end of the rearwardly extending guide arm and the other portion extending about the pulley at the rear of the adjustable frame, the construction being such that the carriage and the saw carried thereby may be manually adjusted without moving the driving belt pulley or its shaft and at the same time maintaining the outer transmitting connection between the driving belt pulley and the pulley on the mandrel shaft by compensation in the belt transmission due to the movement of the guide pulley on the carriage being exactly equal to the movement of the pulley on the saw mandrel; and my improvement further comprehends the positioning of a motor upon the base or body of the machine and mechanically connected to drive the vertical shaft, whereby its weight is entirely removed from the adjustable carriage and from the adjustable frame. While the motor may be of any suitable construction, I prefer, in this present invention, to employ an explosive motor which may be operated without the necessity of requiring a source of electric energy. Where electric energy is available, the motor may be electric, if so desired.

By my improvements, no actual strain is put upon the adjustable carriage by reason of the weight of the motor and any vibration which may be caused by the motor and its transmission gear between it and the vertical shaft is dissipated in the base of the machine and does not extend to the driving belt wheel at the top of the adjustable frame and from which the woodworking parts of the machine are driven.

In my construction, the adjustable carriage has no other work to perform than such as is put upon it by the action of the saw and the adjustment of the belt for keeping it under normal or uniform tension.

My invention also embodies other details of construction which, together with the features above referred to, will be better understood by reference to the drawings, in which:

Fig. 1 is a side elevation of a woodworking machine embodying my invention; Fig. 2 is a transverse section of a portion of the same, showing the special construction or mounting of the adjustable frame and the manner of transmitting power through the vertical shaft; Fig. 3 is a plan view of my improved machine; Fig. 4 is a detail view of the clamping means for locking the adjustable carriage against movement; Fig. 5 is a diagrammatic illustration of the arrangement of the driving belt when the cross cut saw is being driven from the driving pulley; and Fig. 6 is a similar diagrammatic view showing the rear arrangement of the belt when driving the rip saw and jointer devices are being operated.

2 is the main frame or bed of the machine and may be of any suitable construction. 3 is an upright pedestal upon which the frame 4 is secured and adjusted with capacity to swing about a vertical axis, the adjustment being permitted by the turn-table 5 and the extent of the adjustment being shown by the scale 6 upon one portion of the turn-table and a pointer on the other portion. The adjustable frame 4 may be clamped in any suitable position of adjustment by a clamp 5ᵃ. The adjustable frame 4 is provided with a rearwardly extending arm 7 having at its rear end a hub 8 which supports and carries the rear end of a guide arm 9, and said rear end of the frame and guide arm are provided with a bracket 26 upon whose free end is journaled a belt pulley 27. The frame 4 is also provided, on opposite sides of the guide arm 9, with guides 11 for the adjustable carriage 12 which carries the saw 17, said guides being on opposite sides of the axis of the frame 4. The carriage 12 is provided at the forward end with a handle 13 by which it may be grasped and shifted back and forth by the operator.

In the head of the sliding carriage is journaled a mandrel 16 carrying, at one end, the cross cut saw 17, and at the other end a band wheel 19. It will further be seen that the carriage also comprises two rearwardly extending rods 14 slidable through the guides 11 on the adjustable frame, said rods being secured at their rear ends in a transverse frame 15 which is guided upon the rearwardly extending guide arm 9. The frame 15 is extended to one side and carries thereat the pulley 25. It will be seen that the carriage is guided in the guides 11 adjacent to the vertical axis of the frame 4, and is also guided upon the rear end of the guide arm 9, so that it has widely separated points of guiding support.

Secured within the base or body 2 of the machine and preferably adjacent to the floor, is a motor 22 which, in the preferred form, is an explosive or gasoline motor. The general construction of this motor may be according to any suitable type now found upon the market.

40 is a vertical shaft extending upward coincident with the axis of the adjustable frame 4 and being journaled at the upper end of said frame in a ball bearing 10, and also suitably journaled at its lower end in a ball bearing 21 secured to the main frame. Preferably, the said shaft 40 is not in contact with the upwardly projecting pedestal 3 nor with the adjustable frame 4, except through its ball bearing 10, and for this reason, the said shaft runs with little or no appreciable friction. At the upper end of this vertical shaft 40 is secured a driving belt pulley 24 which rotates in a horizontal plane. Secured to the lower end of the shaft 40 is a clutch member 41 which engages the other part of the clutch member formed within the belt pulley 42, and with which it normally engages under the action of a spring 45. 43 is a belt passing about the pulley 42 of the shaft 40 and also about a belt wheel 44 on the shaft of the motor 22, as will be clearly understood by reference to Fig. 1. It will now be seen that when the motor 22 is running and the clutch 42 is in action, the shaft 40 is rotated together with its driving pulley 24. When the clutch 41 is depressed by any suitable means (not shown), the motor 22 may continue to run without operating the shaft 40 or its pulley 24, and this condition may be provided whenever it is necessary to start up the motor when putting the machine into operation. It may also be resorted to when the cross cut saw is not intended to be used and at such times as the belt for driving the cross cut saw is to be adjusted for driving the rip saw and the jointer.

The belt 28, at one end, passes about the driving belt pulley 24, as at 29, and at the other end, about the belt pulley 19 on the saw mandrel shaft 16, as at 30, and the intermediate portions of the belt are looped about the pulleys 25 and 27, as clearly shown in Fig. 1. The tension of the belt may be assured by the tension adjusting devices 23 which permit reasonable adjustment of the pulley 27 upon its support 26.

It will be noted that the pulleys 19, 25 and 27 are all arranged in the same vertical plane and the perimeter of the driving pulley 24 also lies in the said plane, and for this reason, the belt 28 travels with accuracy and has no tendency to jump the belt pulleys. The belt in its loop 29 passing about the horizontal driving belt pulley 24 is given a quarter turn in connection with its passage about the pulleys 25 and 27 (Fig. 3), and while the pulling side of the pulley 24 is outside of the plane of the pulleys 19, 25 and 27, nevertheless, the pull of the belt upon the pulley 27 operates properly in view of the fact that the belt is fed to the pulley 27 in the plane of its rotation, and consequently no amount of pulling by the pulley 24 will displace it from its pulley 27.

It will now be understood that as the carriage 12 is moved to the left, the pulleys 19 and 25 move with it, and as they both move to the same extent, the additional belt length required to bridge the distance between the pulleys 19 and 27 is provided by the corresponding changes in the distance between the driving pulley 24 and pulley 25 on the carriage, thereby insuring the belt remaining at the same tension for all adjustments of the carriage, and, moreover, allowing the carriage to be shifted without in any manner affecting the real transmission of power from the motor to the saw mandrel.

In connection with the capacity for adjustment, it will be noted that the pulley 25 bears a relation to the pulleys 24 and 19, such that the belt length from the pulley 24 to the pulley 25, and from the pulley 19 to the pulley 25 are substantially parallel and are also parallel to the guide 9 for the carriage, and therefore, no amount of adjustment of the latter will materially affect the tension of the belt, so that the transmission is very efficient and at the same time capable of transmitting the power required without undue loss by friction.

31 is a table for supporting the material to be sawed and said table may be adjusted vertically relatively to the main frame of the machine and the saw 17 by means of supporting screws 32 and worm wheel gearing 33, operated by hand wheel 34. Any other suitable manner of supporting and adjusting the table 31 may be employed, if so desired, and I in no wise restrict myself in this respect.

It will now be understood that the saw may operate upon the material resting upon the table and by proper adjustment of the adjustable frame 4, the saw cutting may be produced at right angles or at any other angle to the length of the material desired; and the depth of the saw cut, whether entirely through or partly through the material may be insured by the proper adjustment of the table.

35 represents a rip-saw and is secured to a shaft 36 suitably journaled on the main frame, so that the saw is arranged below the table 31 and by lowering the table sufficiently, may project through the same for becoming operative for ripping lumber guided upon the table. The saws 17 and 35 are sufficiently separated as to their vertical positions that when the table is adjusted in connection with the saw 17, the rip-saw is wholly below the table, and when the table is adjusted for operation with the rip-saw, it is sufficiently lowered below the cross cut saw 17 as to insure the material being ripped to be free of manipulation without contact with the saw 17. The other end of the rip-saw shaft 36 is provided with a belt pulley 37.

At the opposite side of the main frame 2 to which the rip-saw 35 is located, I arrange a jointer 38 of any suitable construction, the cutter thereof being rotated by a belt wheel 39 which is so located with respect to the pulley 37 of the rip-saw, that a belt passing between these pulleys over one end, the other may drive them both at the same time in opposite directions, as has heretofore been customary in machines of this class.

It will now be understood that if the rip-saw and the jointer is to be operated instead of the cross-cut saw, the adjustable frame 4 is swung around its vertical axis on pedestal 3 for 90° and is secured in such position of adjustment by the clamping device 5ª. When this position is assumed, the pulleys 25 and 27 will be in the same vertical plane with the pulleys 37 and 39, and thereupon the looped end 30 of the belt 28 will be disengaged from the pulley 19 and applied about the pulley 37 and continuing upward under the pulley 39, as indicated in Fig. 6. When so adjusted, the operation of the motor 22 will be to drive the rip-saw and the jointer instead of operating the cross cut saw 17. Any adjustment as to tension of the belt may be provided by the adjustment means 23, and as the belt is partly guided by the pulley 25 on the sliding carriage, the same is locked against movement by a suitable clamp 12ª (Figs. 1 and 4).

When adjusting the belt from the pulley 19 to the pulleys 37 and 39, the necessary slack in the belt may readily be obtained by first reducing the tension by the clamp 23, and when the belt is removed from the pulley 19 or from both pulleys 19 and 25 for ready freeing of the belt from the pulley 19 and the mandrel thereof. It may then be placed in position about the pulleys 37 and 39 and after being again adjusted to the pulley 25, the carriage 12 would be pushed back into tension position, as shown, and clamped or locked by the clamping device 12ª or other suitable means; and thereafter, the working tension be provided by the adjusting device 23 for shifting the tension pulley 17 to the desired extent.

It will thus be seen that the machine as a whole, constitutes a universal wood working machine but the special improvements therein constituting the basis of my invention is more particularly directed to that portion of the machine in connection with the cross cut saw support and its operating means.

I have shown the construction of my machine in the preferred form, but it will be understood that in a more generic sense, the invention comprehends a motor of any description arranged on the base or bed frame independent of the adjustable frame and sliding carriage combined with the arrangement of pulleys and belts for driving saws and jointers from the upper end of the adjustable frame 4, and with further provision of power transmitting connections through the vertical or upright pedestal and the adjustable frame supported thereon, whereby the latter may be adjusted about the bearing transmitting connections without interfering with the power transmission from the motor to the saws and jointer.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent, is:

1. In a woodworking machine, the combination with a fixed main frame and a table for supporting the material to be operated upon, of an adjustable frame extending above the main frame and movable about a vertical axis, a horizontally reciprocable carriage guided upon and movable with said adjustable frame, a saw and mandrel therefor journaled on and transversely of the carriage whereby the saw revolves in a plane parallel to the line of movement of the carriage, means to provide a relative adjustment vertically between the table and saw, a motor supported independently of the adjustable frame and carriage, and power transmission means operated by the motor for driving the saw mandrel including a driving pulley arranged at a higher elevation than the carriage and substantially at the vertical axis of the adjustable frame, a vertical shaft extending from the main frame and motor substantially in alinement with the axis of the adjustable frame for driving the pulley, and compensating belt connections from the driving wheel to the mandrel which permits free reciprocation of the carriage while maintaining the power transmitting connection.

2. In a woodworking machine, the combination with a fixed main frame and table for holding the material to be operated upon, of an adjustable frame extending above the main frame and movable about a vertical axis, a horizontally reciprocable carriage guided upon and movable with said adjustable frame, a saw and mandrel therefor journaled on and transversely of the carriage whereby the saw revolves in a plane parallel to the line of movement of the carriage, means to provide a relative adjustment vertically between the table and saw, a motor supported independently of the adjustable frame and carriage, power transmission means operated by the motor for driving the saw mandrel including a driving pulley arranged close to the axis of oscillation of the adjustable frame, a pulley on the saw mandrel arranged to one side of the driving pulley, a guide pulley on the rear of the carriage and movable with it and also a guide pulley on the adjustable frame, both arranged to the opposite side of the driving pulley; and an endless belt having one looped end extending about the horizontal driving pulley and the other looped and extending about the saw mandrel pulley and also having its two intermediate portions respectively looped about the pulleys on the carriage and adjustable frame, said transmission means permitting the free reciprocation of the carriage while maintaining the power transmitting connection.

3. The invention according to claim 1, wherein further, there is provided clutch means on the main frame between the motor and the vertical shaft.

4. In a woodworking machine, a stationary main frame and a motor secured to said frame near the ground and so as to be held in a relatively fixed position thereon, combined with a table for supporting the material to be sawed, a rip-saw extending upward through the table, an adjustable frame extending above the level of the table and motor and supported by the main frame with provision for adjustment about a vertical axis and relatively with respect to the table and motor, a sliding carriage reciprocable horizontally upon the adjustable frame, a saw and mandrel journaled in the sliding carriage, power transmitting connections from the motor upward to the saw mandrel embodying compensating means permitting sliding of the carriage and adjustment thereof about the vertical axis while maintaining operative the power transmission from the motor to the saw, said power transmitting connections also permitting disconnection from the saw mandrel of the carriage and operative connection with the rip-saw, and means to adjust the table vertically relatively to the rip-saw.

5. The invention according to claim 2, wherein further, a rip-saw is arranged at one side of the axis of the adjustable frame and a jointer is arranged at the other side thereof, separate driving pulleys are provided for the rip-saw and jointer revolving in the same vertical plane whereby the belt may at the same time drive both the rip-saw and jointer, and also, the adjustable table is provided with capacity for being adjusted above and below the upper cutting edge of the rip-saw whereby it may be adjusted for cooperation with the rip-saw or with the saw on the sliding carriage.

6. In a woodworking machine, a stationary main frame and a motor secured to said frame near the ground and so as to be held in a relatively fixed position thereon, combined with a table for supporting the material to be sawed, a rip-saw extending upward through the table, an adjustable frame extending above the level of the table and supported by the main frame with motor and provision for adjustment about a vertical axis and relatively with respect to the table and motor, a sliding carriage reciprocable horizontally upon the adjustable frame, a saw and mandrel journaled in the sliding carriage, power transmitting connections from the motor upward and to the saw mandrel embodying compensating means permitting sliding of the carriage and adjustment thereof about the vertical axis while maintaining operative the power transmission from the motor to the saw, said power transmitting connections comprising a vertical shaft extending axially of the adjustable frame and above the level of the carriage at its top and arranged to be operated by the motor at the bottom, a rotatable member above the carriage rotated by the vertical shaft, mechanical compensating connections between the rotatable member and the saw mandrel of the carriage to permit the reciprocation of the carriage while maintaining a driving connection for the saw thereof, means for driving the rip-saw, and means to adjust the table vertically relatively to the rip-saw.

7. In a woodworking machine, the combination of a main frame, an adjustable frame movable about a vertical axis and having a rearward extension, a power shaft having a pulley mounted upon said adjustable frame, an idler pulley mounted upon the rearward extension of the adjustable frame and arranged to swing with the frame about its vertical axis, a reciprocable carriage associated with and supported by said adjustable frame so as to be guided in one plane only, a tool shaft having a pulley mounted on the forward part of said carriage, an idler pulley on the rear end of the carriage, two tool shafts mounted in the main frame having pulleys, and a belt adapted in one position of adjustment to have one end looped about the power shaft pulley and the other end looped about the tool shaft pulley of the carriage and the intermediate portions respectively looped about the idler pulleys and in another position of adjustment to connect the idler pulleys, the power shaft pulley and the pulleys on the two tool shafts mounted in the main frame.

8. In a woodworking machine, the combination of a main frame; a second frame consisting of a post and an extending arm rotatably mounted upon the main frame; guides upon said post; a guide rod mounted between said post and said arm; rods slidably mounted in said guides; a slidable brace having an idler pulley mounted on said guide rod and connecting two ends of said rods; a cross-head connecting the other two ends of said rods; a tool shaft positioned in said cross-head having a pulley and a saw oppositely disposed thereon; an idler pulley mounted upon said arm; a power shaft mounted in said post; a power pulley for said shaft; two tool shafts having pulleys mounted in the main frame; and a belt adapted in one position of adjustment to connect the power shaft pulley, the idler pulleys and the tool shaft pulley mounted in said cross-head, and in another position of adjustment to connect the power shaft pulley, the idler pulleys and the pulleys on the two shafts mounted in the main frame.

In testimony of which invention, I hereunto set my hand.

SAMUEL W. GREEN.